(12) United States Patent
Mercogliano et al.

(10) Patent No.: US 6,521,275 B1
(45) Date of Patent: Feb. 18, 2003

(54) MEAT PRESERVATION PROCESS USING A CARBON MONOXIDE AND HELIUM GAS MIXTURE

(76) Inventors: Vincent Mercogliano, 40 Hollywood Ct., Rockville Centre, NY (US) 11570; Sam Farella, 47-40 Utopia Pkwy., Flushing, NY (US) 11358; William Verdi, 11 Roxbury Rd., East Rockaway, NY (US) 11518; Joseph Verdi, 37 Sylvan Pl., Valley Stream, NY (US) 11571

( * ) Notice: Subject to any disclaimer, the term of this patent is extended or adjusted under 35 U.S.C. 154(b) by 0 days.

(21) Appl. No.: 09/680,615

(22) Filed: Oct. 6, 2000

(51) Int. Cl.[7] .......................................... A23L 3/3409
(52) U.S. Cl. ...................... 426/316; 426/263; 426/264; 426/129
(58) Field of Search ................................ 426/129, 316, 426/264, 265, 263

(56) References Cited

U.S. PATENT DOCUMENTS

| | | | |
|---|---|---|---|
| 2,490,951 A | | 12/1949 | Dunkley |
| 2,965,494 A | | 12/1960 | Williams |
| 3,122,748 A | | 2/1964 | Beebe, Jr. |
| 3,459,117 A | | 8/1969 | Koch et al. |
| 3,930,040 A | * | 12/1975 | Woodruff et al. |
| 4,001,446 A | * | 1/1977 | Hood |
| 4,089,983 A | * | 5/1978 | Hood |
| 4,522,835 A | * | 6/1985 | Woodruff et al. |
| 4,792,455 A | * | 12/1988 | Tallafus |
| 5,128,160 A | * | 7/1992 | Fath et al. |
| 5,269,149 A | * | 12/1993 | Zeidler |
| 5,425,956 A | * | 6/1995 | Shahidi et al. |
| 5,597,599 A | * | 1/1997 | Smith et al. |
| 5,871,795 A | * | 2/1999 | Roth |
| 5,989,610 A | * | 11/1999 | Ruzek |
| 6,042,859 A | * | 3/2000 | Shaklai |
| 6,113,962 A | * | 9/2000 | Spencer |
| 6,210,730 B1 | * | 4/2001 | Mitchell |
| 6,331,322 B1 | * | 12/2001 | Shih et al. |

FOREIGN PATENT DOCUMENTS

JP 5-316939 * 12/1993 ................. 426/129

OTHER PUBLICATIONS

J. of Food Quality, vol. 17, #3, p. 231 Plus, Brewer et al., Jun. 1994.*
J. of Food Science, 1972.*

* cited by examiner

*Primary Examiner*—Steve Weinstein
(74) *Attorney, Agent, or Firm*—Scully, Scott, Murphy & Presser

(57) ABSTRACT

A meat preservation process using a carbon monoxide and helium mixture as a preservant which achieves a limited penetration into the meat such that the color of the meat is not altered after cooking, comprising, applying a vacuum to the meat to remove atmospheric gases from the surface of the meat, introducing the carbon monoxide and helium mixture to achieve a limited penetration of the mixture into the surface of the meat, and applying a second vacuum to the meat.

10 Claims, 1 Drawing Sheet

MEAT PRESERVATION PROCESS USING A CARBON MONOXIDE AND HELIUM GAS MIXTURE

BACKGROUND OF THE INVENTION

1. Field of the Invention

The present invention relates generally to a meat preservation process using a carbon monoxide and helium gas mixture. More particularly, the subject invention pertains to a meat preservation process using a carbon monoxide and helium gas mixture as a preservant for meat, poultry, and fish which achieves a limited penetration of the preserving gas mixture into the meat, such that the color of the meat is not altered after cooking.

2. Discussion of the Prior Art

Beebe U.S. Pat. No. 3,122,748 and Koch, et al. U.S. Pat. No. 3,459,117 discloses processes for treating red meat with a gas which is essentially 100% carbon monoxide.

Williams U.S. Pat. No. 2,965,494 discloses a process for treating meat which combines irradiation by x-rays and exposure to a mixture of gasses including carbon monoxide at levels of 0.5 to 1.5%, nitrogen and carbon dioxide.

Dunkley U.S. Pat. No. 2,490,951 discloses a process for treating meat, fruits and vegetables with a gas mixture containing 0.5 to 40% carbon monoxide and acetylene to inhibit oxidation of metabolites such as carbohydrates, proteins and fats.

Woodruff U.S. Pat. No. 3,930,040 discloses a process for treating meat with a gas mixture consisting of carbon monoxide, oxygen and carbon dioxide.

In contrast to the prior art, the meat preservation process of the present invention uses a carbon monoxide and helium gas mixture with a very low percentage of carbon monoxide. The present invention also provides a safer process than many of the prior art processes since the higher concentrations of carbon monoxide disclosed by the prior art are inflammable (carbon monoxide>7%) and more dangerous to work with. Moreover, higher percentages of carbon monoxide permanently alter the color of the meat even after cooking, which is a significant problem. The process of the present invention does not permanently alter the color of the meat since the process provides a surface superficial treatment of the meat, and total penetration of the preserving gases into the meat is not achieved.

Also, many prior art patents employ a secondary active agent. Williams U.S. Pat. No. 2,965,494 uses irradiation, while other patents use treatments such as ascorbic acid to help preservation of meat.

Moreover, no prior art processes use vacuum packaging before and after exposure to a preserving gas mixture.

SUMMARY OF THE INVENTION

Accordingly, it is a primary object of the present invention to provide a meat preservation process using a carbon monoxide and helium gas mixture.

A further object of the subject invention is the provision of a meat preservation process using a carbon monoxide and helium gas mixture as a preservant for meat, poultry and fish which achieves a limited penetration of the preserving gas mixture into the meat, such that the color of the meat is not altered after cooking.

BRIEF DESCRIPTION OF THE DRAWINGS

The foregoing objects and advantages of the present invention for a meat preservation process using a carbon monoxide and helium gas mixture may be more readily understood by one skilled in the art with reference being had to the following detailed description of several preferred embodiments thereof, taken in conjunction with the accompanying drawing wherein.

DETAILED DESCRIPTION OF THE DRAWINGS

Figure 1:
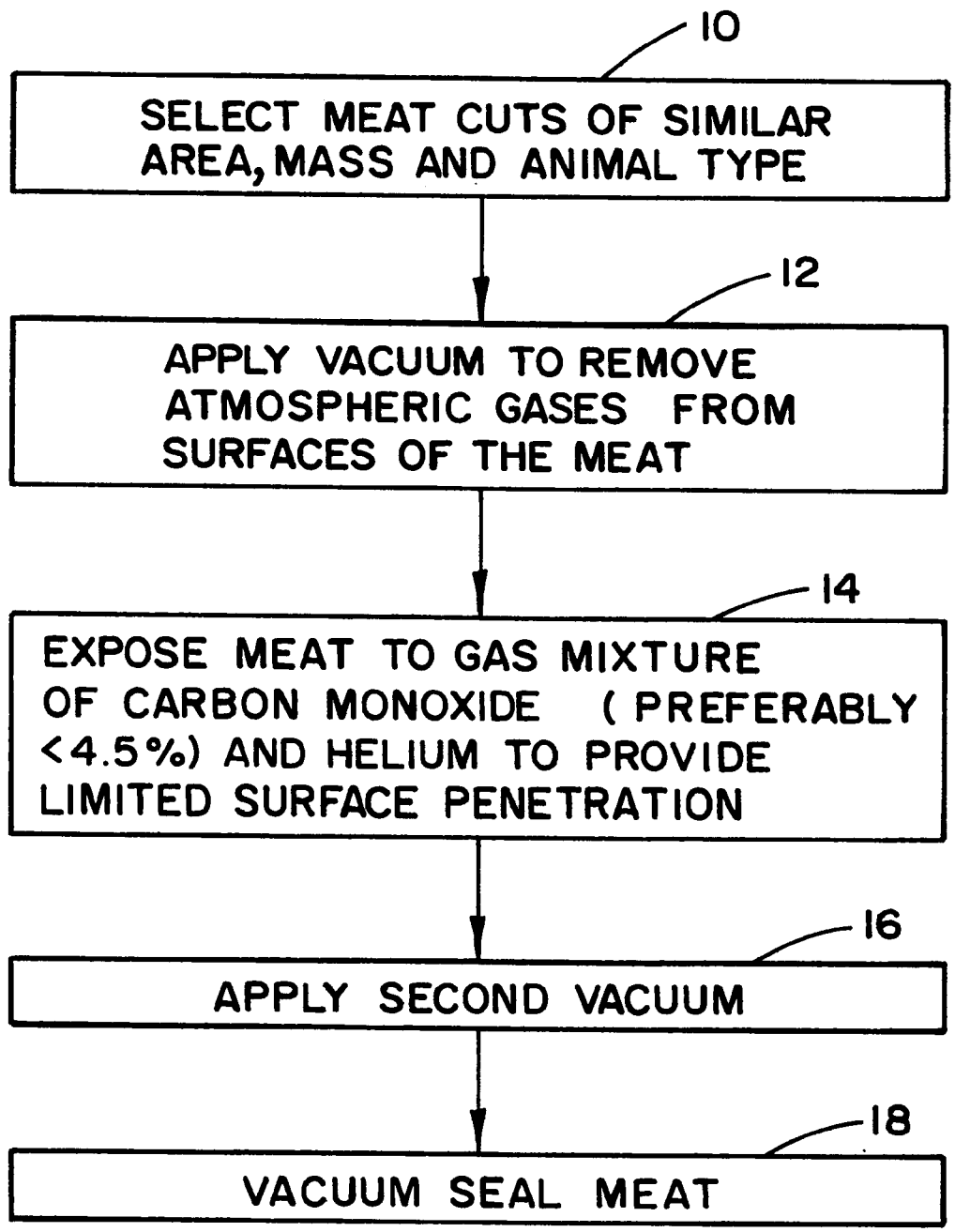
FIG. 1 illustrates the sequential steps of the meat preservation process of the present invention.

Referring to FIG. 1, in a first step 10, meat cuts of similar area, mass and animal type are chosen for treatment in each batch in the meat preservation process of the present invention.

Each batch of meat is placed in a controlled refrigerated environment in a process chamber wherein in a second step 12 a vacuum is applied to remove atmospheric gases from the process chamber and the surfaces of each meat cut.

In a third step 14, a controlled atmosphere of a helium/carbon monoxide gas mixture, with a preferred maximum carbon monoxide content of 4.5% or less, is introduced into the process chamber environment. The overall goal is to achieve a limited penetration of carbon monoxide and helium into the surfaces of each meat cut. The depth or level of penetration of the carbon monoxide and helium gas mixture into each meat cut will vary with each meat cut and type. The probable depth of penetration will be no greater than one to three millimeters. The meat cuts are exposed to the gas mixture for a variable length of time based upon the size, cut and animal type. The length of time of exposure to the gas mixture is typically six to eight hours for exposure to a gas mixture at substantially atmospheric pressure. However, it is noted that the exposure time can be reduced by increasing the pressure of the gas mixture inside the process chamber.

After a desired penetration of the gas mixture into the meat tissue is achieved, the gas mixture is flushed from the process chamber, and at step 16, a second vacuum is applied inside the process chamber.

The meat is then vacuum sealed in a wrapped package at step 18. The wrapping can be a type of film material selected to be breathable to release by diffusion therethrough whatever carbon monoxide or helium is subsequently released by the meat.

Packages of meat treated pursuant to the process of the present invention can maintain a healthy fresh and reddish appearance for up to twenty eight days after packaging.

Each of the carbon monoxide and helium gases serves several important functions in the meat preservation process of the present invention.

Carbon monoxide functions as the actual and only preserving agent. Carbon monoxide is a colorless and odorless gas which can be a very dangerous toxin when inhaled. Carbon monoxide is also a highly reactive gas, binding to a number of cellular enzymes, especially hemoglobin and myoglobin found in animal muscle cells.

Carbon monoxide serves to preserve meat through a number of biological effects.

First, it encourages an oxygen free environment on the superficial surface areas of the meat. As the gas mixture diffuses into and throughout the outer surface areas of the meat tissue, any oxygen bound in the meat tissue is displaced by the more reactive carbon monoxide and diffuses, following its concentration gradient, to the extremely low oxygen atmosphere (caused by the oxygen release) of the process chamber. The tightly bound carbon monoxide displaces and prevents any free oxygen from remaining in the meat tissues. Additionally, the carbon monoxide can also react with and bind free oxygen to form a more stable molecule, carbon dioxide. The anoxic environment also reduces and slows the growth of both facultative bacteria and aerobic bacteria types on the meat surfaces.

Secondly, the highly reactive carbon monoxide attacks bacterial cells which may be present on or within the superficial tissue areas of the meat. The high reactivity of the carbon monoxide molecules can lead to a number of biosynthetic failures resulting in the destruction of pathogenic bacteria.

Thirdly, the carbon monoxide binds to myoglobin in the meat tissue to present and maintain a bright red color to present a fresh and healthy appearance for the meat.

Helium is the second gas of the preserving gas mixture. The nonreactivitiy of helium makes it an ideal carrier for the highly reactive carbon monoxide. Also, helium has a small molecule, and is a nonreactive and noncharged gas, and the small molecules of helium penetrate and diffuse more deeply into the meat tissues. After the second vacuum is applied in the process, the highly diffusible helium is evacuated from the meat tissues and the package itself without affecting the taste of the meat or the preservation process.

Although helium is considered to be a significant component of the gas mixture, in some embodiments the gas mixture could also include other gases, particularly other inert gases.

The overall effect of the process of the present invention is to provide a meat cut which has a long shelf life, and a meat cut which maintains a healthy and fresh appearance and has excellent taste qualities. Since the penetration of the gas mixture into the surface of the meat is only superficial, after cooking the meat does not retain it's red appearance because the carbon monoxide is released and diffused out during the heating and cooking process. In contrast thereto, meat processed with a high concentration of carbon monoxide disadvantageously retains a reddish color even after cooking.

A preferred range of carbon monoxide in the gas mixture of helium and carbon monoxide is from 1.5 to 10% carbon monoxide, with the remainder of the gas mixture being helium. A more preferred range is from 1.5 to 4.5% carbon monoxide, with the remainder of the gas mixture being helium. A gas mixture having 4.5% or less carbon monoxide is generally accepted as safe and within some legal guidelines and limits.

The present invention is susceptible of being performed in batch processes or in continuous line processes.

A preferred process subjects only one (the upper) side of the cuts of meat to the gas mixture of helium and carbon monoxide, such that the second (under) sides of the cuts of meat are not exposed to the gas mixture of helium and carbon monoxide. In this manner, the second sides of the cuts of meat provide a truer indication of the aging and deterioration of the meat with time, to enable a consumer to more readily determine when the cuts of meat are not acceptable for consumption.

The meat is typically exposed to the carbon monoxide-helium mixture for approximately six to eight hours at a substantially atmospheric pressure. It is also possible to provide the gas mixture in a more pressurized system to reduce the time of exposure of the meat to the carbon monoxide-helium mixture. The meat product is then vacuumed packed and placed under refrigeration. With the carbon monoxide-helium treatment used in conjunction with vacuum packaging, the packaged meat in either bulk portions or retail portions will retain a healthy fresh appearance having a reddish color for up to 28 days. The process of the present invention is applicable to all fresh meats including beef, veal, pork, lamb, poultry and also fish.

While several embodiments and variations of the present invention for a meat preservation process using a carbon monoxide and helium gas mixture are described in detail herein, it should be apparent that the disclosure and teachings of the present invention will suggest many alternative embodiments to those skilled in the art.

What is claimed is:

1. A method for preserving and packaging meat comprising:
   a. subjecting the meat to a first vacuum to remove atmospheric gases from the meat;
   b. exposing the meat to a preserving gas mixture of helium and carbon monoxide, having a maximum carbon monoxide content of 10 percent, for a length of time sufficient to achieve limited penetration of the gas mixture of helium and carbon monoxide into the surface of the meat;
   c. removing the gas mixture of helium and carbon monoxide from exposure to the meat;
   d. subjecting the meat to a second vacuum to remove gases from the meat; and
   e. sealing the meat in a package.

2. The method for preserving and packaging meat as in claim 1, wherein the preserving gas mixture has a maximum carbon monoxide content of 4.5 percent or less.

3. The method for preserving and packaging meat as in claim 1, wherein the remainder of the preserving gas mixture is substantially all helium.

4. The method for preserving and packaging meat as in claim 1, wherein the meat is vacuum sealed in a vacuum package.

5. The method for preserving and packaging meat as in claim 1, wherein the meat comprises one of red meat, poultry and fish.

6. The method for preserving and packaging meat as in claim 1, wherein the meat includes meat cuts of similar area, mass and animal type.

7. The method for preserving and packaging meat as in claim 1, wherein a batch of meat is processed in a batch process in a process chamber.

8. The method for preserving and packaging meat as in claim 7, wherein the gas mixture in the process chamber is maintained above atmospheric pressure.

9. The method for preserving and packaging meat as in claim 1, wherein only one side of the meat is exposed to the gas mixture, such that the other side of the meat provides a truer indication of aging and deterioration of the meat with time.

10. The method for preserving and packaging meat as in claim 1, wherein the package is wrapped with a clear plastic wrap which selectively breathes and diffuses therethrough any carbon monoxide or helium released by the meat.

* * * * *